US012756716B2

(12) United States Patent
Venkatraman et al.

(10) Patent No.: US 12,756,716 B2
(45) Date of Patent: Oct. 6, 2026

(54) NETWORK SECURITY USING PRIMARY AND SECONDARY SECURITY GROUP TAGS

(71) Applicant: Cisco Technology, Inc., San Jose, CA (US)

(72) Inventors: Rajagopal Venkatraman, San Jose, CA (US); Shawn Michael Wargo, Colorado Springs, CO (US)

(73) Assignee: Cisco Technology, Inc., San Jose, CA (US)

( * ) Notice: Subject to any disclaimer, the term of this patent is extended or adjusted under 35 U.S.C. 154(b) by 42 days.

(21) Appl. No.: 19/036,919

(22) Filed: Jan. 24, 2025

(65) Prior Publication Data

US 2026/0222411 A1 Jul. 30, 2026

(51) Int. Cl.

*H04L 45/00* (2022.01)
*H04L 9/40* (2022.01)

(52) U.S. Cl.

CPC ............ *H04L 63/104* (2013.01); *H04L 45/00* (2013.01); *H04L 63/0236* (2013.01); *H04L 63/0892* (2013.01)

(58) Field of Classification Search

CPC ............. H04L 61/5007; H04L 63/0236; H04L 63/0892; H04L 63/104; H04L 63/20; H04L 61/5014; H04L 2101/622; H04L 61/103; G06F 9/45558; G06F 2009/45595; G06F 2009/45587

See application file for complete search history.

(56) References Cited

U.S. PATENT DOCUMENTS

| | | | | |
|---|---|---|---|---|
| 11,516,184 | B2 * | 11/2022 | Jain | H04L 63/0272 |
| 12,069,098 | B2 * | 8/2024 | Murthy | H04L 61/5007 |
| 2011/0271102 | A1 | 11/2011 | Smith | |
| 2012/0155349 | A1 * | 6/2012 | Bajic | H04L 69/329 370/310 |
| 2015/0319139 | A1 | 11/2015 | Song et al. | |
| 2019/0215303 | A1 | 7/2019 | Appala et al. | |

(Continued)

FOREIGN PATENT DOCUMENTS

| | | | |
|---|---|---|---|
| CN | 105682073 | A | 6/2016 |
| KR | 20180007898 | A | 1/2018 |

OTHER PUBLICATIONS

Search Report and Written Opinion for International Application No. PCT/US26/11055, Dated Mar. 27, 2026, 16 pages.

*Primary Examiner* — Mohammad A Siddiqi
(74) *Attorney, Agent, or Firm* — Lee & Hayes, P.C.

(57) ABSTRACT

Techniques and architecture are described that provide secondary identifiers or group tags, e.g., security group tags (SGTs). Control security policies may then be provided for entities within a networking arrangement and separate policies per entity may be provided. This results in assigning a primary SGT per entity and secondary SGTs per entity, wherein the secondary SGT categories are the same at each entity. For example, the secondary SGTs may represent a location, a person, an organization, a partner of the organization, a service, a database, a type of record, etc. Generally, the primary SGTs may represent a location, an entity, an organization, a partner of the organization, a person, etc. Utilizing the "hierarchal" SGT arrangement described herein, security may be efficiently enforced once at an ingress network node using primary SGTs and again at the egress network node using secondary SGTs.

20 Claims, 11 Drawing Sheets

(56) References Cited

U.S. PATENT DOCUMENTS

| | | | | |
|---|---|---|---|---|
| 2020/0162355 | A1* | 5/2020 | Zacks | H04L 43/10 |
| 2021/0314228 | A1* | 10/2021 | Chandrashekhar | H04L 41/0803 |
| 2022/0272033 | A1 | 8/2022 | Jain et al. | |
| 2022/0417287 | A1 | 12/2022 | Joshi et al. | |
| 2023/0077101 | A1* | 3/2023 | Venkatraman | H04L 43/50 |
| 2024/0406183 | A1 | 12/2024 | Comeras | |
| 2025/0278415 | A1* | 9/2025 | Mui | G06F 16/9024 |

* cited by examiner

| P-SGT | S-SGT | DGT | POLICY |
|---|---|---|---|
| CORPORATION 302 | ENGINEER | HVAC | PERMIT |
| CORPORATION 302 | ENGINEER | CCTV | PERMIT |
| PARTNER | CONTRACTOR | CORPORATION 304 | PERMIT |
| PARTNER | CONTRACTOR | HVAC | DENY |
| PARTNER | CONTRACTOR | CCTV | PERMIT |
| PARTNER | CONTRACTOR | CORPORATION 302 | DENY |

TABLE 324

NETWORK SECURITY USING PRIMARY AND SECONDARY SECURITY GROUP TAGS

TECHNICAL FIELD

The present disclosure relates generally to network security requiring multiple security group tags (SGTs), and more particularly, to network security requiring multiple SGTs using primary SGTs and secondary SGTs.

BACKGROUND

With current networking scenarios, security is of utmost importance. Often, certain parties, locations, organizations, people, services, databases, etc., that are not authorized to interact, e.g., exchange packets of data, with certain other parties, locations, organizations, people, services, databases, etc. Thus, it becomes an issue as to how to deliver secure service within scalability limits within networking scenarios. Currently, identifiers such as, for example, group tags, e.g., security group tags (SGTs), may be used. Often, it is difficult to distinguish between similar device types from different sites or locations within networking arrangements. Thus, different SGTs are assigned. However, this can lead to the scalability issues. For example, if there are a thousand physical sites within a networking arrangement and each site has 20 or more SGTs, then 20,000 or more SGTs are required. Since there a finite number of SGTs that may be practically used, given the scalability issues, it becomes difficult to enforce security measures within networking arrangements, especially large networking arrangements.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
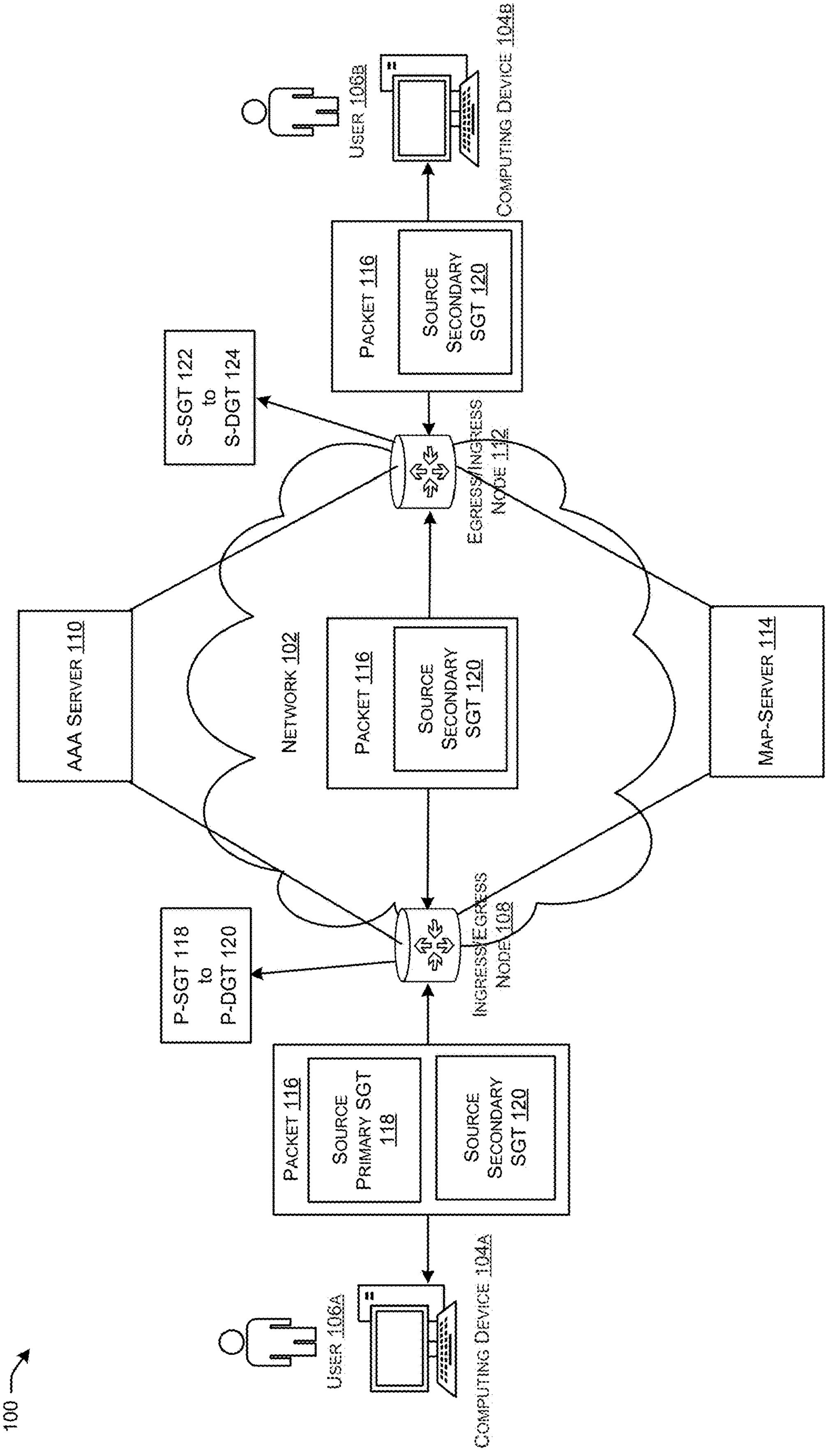
FIG. 1 schematically illustrates an example of a portion of a network, where primary SGTs and secondary SGTs are used for SGACL security within networking arrangements, in accordance with techniques and architecture described herein.

The present disclosure provides techniques and architecture that provide secondary identifiers or group tags, e.g., security group tags (SGTs). Control security policies may then be provided for entities within a networking arrangement and separate policies per entity may be provided. This results in assigning a primary SGT per entity and secondary SGTs per entity, wherein the secondary SGT categories are the same at each entity. For example, the secondary SGTs may represent a location, a person, an organization, a partner of the organization, a service, a database, a type of record, etc. Generally, the primary SGTs may represent a location, an entity, an organization, a partner of the organization, a person, etc. However, it is to be noted that the examples of secondary SGTs and primary SGTs are just examples and are not meant to be limiting. Utilizing the "hierarchal" SGT arrangement described herein, security may be efficiently enforced once at an ingress network node using primary SGTs and again at the egress network node using secondary SGTs. This may be done without any changes to the transport constraints of carrying two tags within packets.

More particularly, a separate enforcement point may be provided at the edge for a primary/micro level/network site specific level. Once the initial enforcement point has verified the packet at the initial, primary level, the primary tag may be dropped and the packet may be forwarded to the destination carrying only the secondary group tag (a secondary/micro level/service specific representation) for the source. At the destination network node, e.g., the egress node, enforcement may occur as currently performed using a single (secondary) source group tag compared to a single destination group tag. Based upon control rules, this may determine whether the packet may be forwarded by the egress node to the destination host. This arrangement avoids the issue of carrying both the primary (macro) group tag and the secondary (micro) group tag to the destination. In addition, the egress edge node does not have any changes with respect to current security behavior of such nodes.

As an example, a method may comprise receiving, at a first node of a network from a first host, a packet, wherein the packet comprises a first group tag and a second group tag, and wherein the packet is destined for a second host that is associated with a third group tag. The method may also comprise based at least in part on the first group tag and the third group tag, determining, by the first node of the network using a first control rule, if the packet may be forwarded to the second host. The method may further comprise upon determining that the packet may be forwarded to the second host, dropping, by the first node of the network, the first group tag from the packet. The method may additionally comprise forwarding, by the first node to a second node of the network, the packet. The method may also comprise based at least in part on the second group tag and a fourth group tag, determining, by the second node of the network, if the packet may be forwarded to the second host. The method may further comprise upon determining by the second node that the packet may be forwarded to the second host, forwarding, by the second node of the network, the packet to the second host.

EXAMPLE EMBODIMENTS

In accordance with configurations described herein, as previously noted, the present disclosure provides techniques and architecture that provide secondary identifiers or group tags, e.g., security group tags (SGTs). Control security policies may then be provided for entities within a networking arrangement and separate policies per entity may be provided. This results in assigning a primary SGT per entity and secondary SGTs per entity, wherein the secondary SGTs are the same at each entity. For example, the secondary SGTs may represent a location, a person, an organization, a partner of the organization, a service, a database, a type of record, etc. Generally, the primary SGTs may represent a location, an entity, an organization, a partner of the organization, a person, etc. However, it is to be noted that the examples of secondary SGTs and primary SGTs are just examples and are not meant to be limiting. Utilizing the "hierarchal" SGT arrangement described herein, security may be efficiently enforced once at an ingress network node using primary SGTs and once at the egress network node using secondary SGTs. This may be done without any changes to the transport constraints of carrying two tags within packets.

More particularly, a separate enforcement point may be provided at an ingress node (edge) related to a primary/macro level/network site specific level for security enforcement. When a packet carrying both a primary SGT and a secondary SGT related to the source of the packet is received at the ingress node, the primary SGT may be evaluated with respect to a primary SGT for the destination of the packet. Once the initial enforcement point (e.g., a router, a switch, etc.) has verified the packet at the initial, primary level, using the primary SGT, the primary SGT may be dropped from the packet and the packet may be forwarded to the destination carrying only the secondary SGT related to a secondary/micro level/service specific level related to the source.

At a destination network node, e.g., an egress node such as, for example, a router, a switch, etc., enforcement may occur as currently performed with a single source secondary SGT being evaluated with respect to a single destination secondary SGT. Based upon control rules, this may determine whether the packet may be forwarded by the egress node to the destination. This arrangement avoids the issue of carrying both the primary (macro) source SGT and the secondary (micro) source SGT. In addition, the egress edge node does not have any changes with respect to current security behavior of such nodes in networking arrangements.

More particularly, as an example, a source host may onboard with an ingress node of a network, e.g., an access switch. The source host may be authenticated with an authentication, authorization, and accounting (AAA) server. The AAA may then provide the authorization for the source host and assign primary security group tags (P-SGTs) and secondary security group tags (S-SGTs). Likewise, a destination host may onboard with an egress node, e.g., an access switch, and the egress node may perform authentication of the destination host with the AAA server. The AAA server may provide authorization to the egress node with the P-SGTs and S-SGTs for the source host.

The ingress node may perform a map registration of the P-SGTs and S-SGTs with a map-server. Likewise, the egress node may perform a map registration of the P-SGTs and S-SGTs for the destination host with the map server.

The ingress node may then perform a map-request for the destination host with the map server. The map server may provide a map reply for the destination host that includes P-SGTs and S-SGTs for the destination host. For clarity, in this example, the P-SGTs and S-SGTs may be referred to as the P-DGTs and the S-DGTs when referring to the destination host or hosts.

When the source host provides a packet to the ingress node, the ingress node may now perform security group access control list (SGACL) enforcement using the P-SGT and the P-DGT. Based upon control rules defined by the SGACL, if the P-SGT and the P-DGT are acceptable, for example, the location of the source host is allowed to communicate with the location of the destination host, then the ingress node may drop the P-SGT from the packet and forward the packet, carrying only the source S-SGT in the packet header, to the egress node. Otherwise, the ingress node drops the packet.

Once the packet arrives at the egress node, the egress node may perform SGACL enforcement using the source S-SGT and the destination S-DGT, e.g., is a particular user allowed to access medical records at the destination host at this location. If permitted, then the packet may be forwarded to the destination host. Otherwise, the egress node drops the packet.

Accordingly, in configurations, a method comprises receiving, at a first node of a network from a first host, a packet, wherein the packet comprises a first group tag and a second group tag, and wherein the packet is destined for a second host that is associated with a third group tag. The method also comprises based at least in part on the first group tag and the third group tag, determining, by the first node of the network using a first control rule, if the packet may be forwarded to the second host. The method further comprises upon determining that the packet may be forwarded to the second host, dropping, by the first node of the network, the first group tag from the packet. The method additionally comprises forwarding, by the first node to a second node of the network, the packet. The method also comprises based at least in part on the second group tag and a fourth group tag, determining, by the second node of the network, if the packet may be forwarded to the second host. The method further comprises upon determining by the second node that the packet may be forwarded to the second host, forwarding, by the second node of the network, the packet to the second host.

In configurations, the method further comprises upon determining, by the first node of the network, that the packet may not be forwarded to the second host, dropping, by the first node of the network, the packet.

In configurations, the method also comprises upon determining, by the second node of the network, that the packet may not be forwarded to the second host, dropping, by the second node of the network, the packet.

In configurations, the method further comprises onboarding, by the first node of the network, the first host; authenticating, by the first node of the network with an authentication, authorization, and accounting (AAA) server, the first host; and authenticating, by the AAA server, the first host, wherein during the authenticating, the first tag and the second tag are provided to the first node of the network by the AAA server.

In some configurations, the method further comprises registering, by the first node of the network a map server, the first tag and the second tag.

In configurations, the method further comprises onboarding, by the second node of the network, the second host; authenticating, by the second node of the network with an authentication, authorization, and accounting (AAA) server, the second host; and authenticating, by the AAA server, the second host, wherein during the authenticating, the third tag and the fourth tag are provided to the second node of the network by the AAA server.

In some configurations, the method further comprises registering, by the second node of the network a map server, the third tag and the fourth tag.

Thus, the techniques and architecture described herein provide secondary identifiers or group tags, e.g., security group tags (SGTs). Control security policies may then be provided for entities within a networking arrangement and separate policies per entity may be provided. This results in assigning a primary SGT per entity and secondary SGTs per entity, wherein the secondary SGT categories are the same at each entity. For example, the secondary SGTs may represent a location, a person, an organization, a partner of the organization, a service, a database, a type of record, etc. Generally, the primary SGTs may represent a location, an entity, an organization, a partner of the organization, a person, etc. However, it is to be noted that the examples of secondary SGTs and primary SGTs are just examples and are not meant to be limiting. Utilizing the "hierarchal" SGT arrangement described herein, security may be efficiently enforced once at an ingress network node using primary SGTs and again at the egress network node using secondary SGTs. This may be done without any changes to the transport constraints of carrying two tags within packets.

More particularly, a separate enforcement point is provided at the edge for a primary/micro level/network site specific level. Once the initial enforcement point has verified the packet at the initial, primary level, the primary tag may be dropped and the packet may be forwarded to the destination carrying only the secondary group tag (a secondary/micro level/service specific representation) for the source. At the destination network node, e.g., the egress node, enforcement may occur as currently performed using a single (secondary) source group tag compared to a single destination group tag. Based upon control rules, this may determine whether the packet may be forwarded by the egress node to the destination host. This arrangement avoids the issue of carrying both the primary (macro) group tag and the secondary (micro) group tag to the destination. In addition, the egress edge node does not have any changes with respect to current security behavior of such nodes.

While embodiments and configurations described herein may refer to Locator ID Separation Protocol (LISP) techniques and/or architecture, it is to be understood that the techniques and architecture described herein are equally applicable to other protocols, e.g., ethernet virtual private network (EVPN).

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 schematically illustrates an example of a portion of a networking arrangement 100. In configurations, the networking arrangement 100 includes one or more network(s) 102. The networking arrangement 100 further includes hosts in the form of computing devices 104*a*, 104*b*. The computing devices 104*a*, 104*b* may be in the form of, for example, a conventional server computer, router, switch, workstation, desktop computer, laptop, tablet, network appliance, e-reader, smartphone, or other computing device such as, for example, a System-on-Chip (SoC), Application-specific Integrated Circuit (ASIC), etc. The list of examples for computing devices 104*a*, 104*b* is not meant to be limiting. Additionally, the computing devices 104*a*, 104*b* may be different types of computing devices or may be the same type of computing device. In configurations, one or more users 106*a*, 106*b* may interact with the computing devices 104*a*, 104*b*.

In configurations, computing device 104*a* may wish to interact, e.g., communicate, with computing device 104*b*. Thus, computing device 104*a* may serve as a source host and may onboard with an ingress/egress node 108 of a network, e.g., an access switch. The computing device 104*a* may be authenticated by the ingress/egress node 108 with an authentication, authorization, and accounting (AAA) server 110. The AAA server 110 may then provide the authorization for the computing device 104*a* and assign primary security group tags (P-SGTs) and secondary security group tags (S-SGTs). Likewise, the computing device 104*b* may serve a destination host and may onboard with an egress/ingress node 112, e.g., an access switch, and the egress/ingress node 112 may perform authentication of the computing device 104*a* with the AAA server 110. The AAA server 110 may provide authorization to the egress/ingress node 112 with the P-SGTs and S-SGTs for the computing device 104*b*.

The ingress/egress node 108 may perform a map registration of the P-SGTs and S-SGTs with a map-server 114. Likewise, the egress/ingress node 112 may perform a map registration of the P-SGTs and S-SGTs for the destination host (computing device 104*b*) with the map-server 114.

The ingress/egress node 108 may perform a map-request for the computing device 104*b* with the map-server 114. The map-server 114 may provide a map-reply for the destination host that includes P-SGTs and S-SGTs for the computing device 104*b*. For clarity, in this example, the P-SGTs and S-SGTs may be referred to as the P-DGTs and the S-DGTs when referring to the destination host or hosts.

When the computing device 104*a* provides a packet 116 to the ingress/egress node 108, the ingress/egress node 108 may perform security group access control list (SGACL) enforcement using the P-SGT 118 and the P-DGT 120. Based upon control rules defined by the SGACL, if the P-SGT 118 and the P-DGT are acceptable, for example, the location of the computing device 104*b* is allowed to communicate with the location of the computing device 104*b*, then the ingress/egress node 108 may drop the P-SGT 118 from the packet 116 and forward the packet 116, carrying only the source S-SGT 122 in the packet header, to the egress/ingress node 112. Otherwise, the ingress/egress node 108 drops the packet 116.

Once the packet 116 arrives at the egress/ingress node 112, the egress/ingress node 112 may perform SGACL enforcement using the source S-SGT 122 and the destination S-DGT 124, e.g., is a particular user, e.g., user 106*a*, (represented by S-SGT 122) allowed to access medical records (represented by the S-DGT 124). If permitted, then the packet 116 may be forwarded to the computing device 104*b*. A similar process may be used for packets sent from the computing device 104*b* (now the source host) to the computing device 104*a* (destination host).

Figure 2:
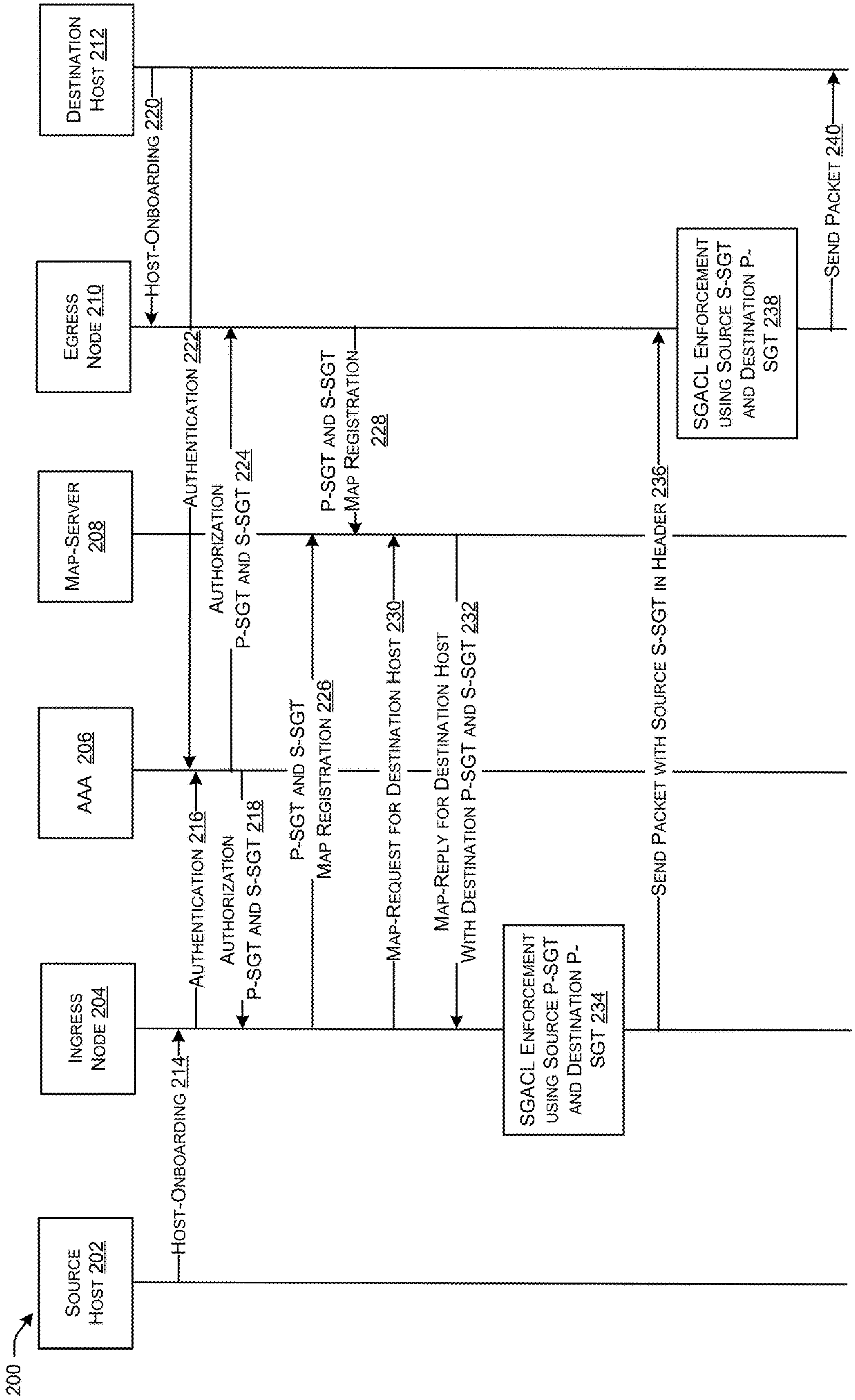
FIG. 2 a flow diagram of an example process of using primary SGTs and secondary SGTs for SGACL security within networking arrangements, in accordance with techniques and architecture described herein.

FIG. 2 is a flow diagram of an example process 200 of using primary SGTs and secondary SGTs for SGACL security within networking arrangements. FIG. 2 includes a source host 202, e.g., computing device 104*a*, an ingress node 204, e.g., ingress/egress node 108, an authentication, authorization, and accounting (AAA) server 206, e.g., AAA server 110, a map-server 208, e.g., map-server 114, an egress node 210, e.g., egress/ingress node 112, and a destination host 212, e.g., computing device 104*b*.

At 214, the source host 202 onboards with the ingress node 204 of a network, e.g., an access switch. At 216, the source host 202 is authenticated by the ingress node 204 with the AAA server 206. At 218, the AAA server 206 may then provide the authorization for the source host 202 and assign primary security group tags (P-SGTs) and secondary security group tags (S-SGTs).

Likewise, at 220, the destination host 212 onboards with the egress node 210, e.g., an access switch. At 222, the egress node 210 performs authentication of the destination host 212 with the AAA server 206. At 224, the AAA server 110 provides authorization to the egress node 210 with the P-SGTs and S-SGTs for the destination host 212.

At 226, the ingress node 204 performs a map registration of the P-SGTs and S-SGTs with the map-server 208. Likewise, at 228, the egress node 210 performs a map registration of the P-SGTs and S-SGTs for the destination host with the map server.

At 230, the ingress node 204 performs a map-request for the computing device 104*b* with the map-server 208. At 232, the map-server 208 provides a map-reply for the destination host that includes P-SGTs and S-SGTs for the destination host 212.

When the source host provides a packet, e.g., packet 116, to the ingress node 204, at 234, the ingress node 204 performs security group access control list (SGACL) enforcement using the source P-SGT and the destination P-SGT. Based upon control rules defined by the SGACL, if the P-SGT 118 and the P-DGT are acceptable, for example, the location of the source host 202 is allowed to communicate with the location of the destination host 212, then at 236, the ingress node 204 may drop the source P-SGT from the packet and forward the packet, carrying only the source S-SGT in the packet header, to the egress node 210. Otherwise, the ingress node 204 drops the packet.

Once the packet 116 arrives at the egress/ingress node 112, at 238, the egress node 210 may perform SGACL enforcement using the source S-SGT and the destination S-SGT, e.g., is a particular user (represented by source S-SGT) allowed to access medical records (represented by the destination S-SGT). If permitted, then at 240, the packet 116 may be forwarded to the destination host 212. Otherwise, the egress node 210 drops the packet. A similar process may be used for packets sent from the destination host 202 to the source host 202.

FIGS. 3A-3G schematically illustrate an example of a networking arrangement 300 using primary SGTs and secondary SGTs for SGACL security within networking arrangements. As an example, a corporation may own various endpoints including host 302 and host 304. The corporation may also own all of, part of, or none of network 306. Additionally, multiple networks at least similar to network 306 may be used to couple host 302 and host 304. The corporation may have an engineer 308. A partner of the corporation may have at least one endpoint in the form of host 310. The partner may include at least one contractor 312. In the present example, the host 304 may provide heating and cooling (HVAC) information 314 and closed-circuit television (CCTV) information 316.

Security group access control lists (SGACL) rules may be established. In this example, the corporation may access the host 302 and the host 304. The partner may access the host 304 via host 310 but may not access the host 302 via the host 310. Additionally, the engineer 308 may access the HVAC information 314 and the CCTV information 316 but the contractor 310 may only access the CCTV information 316.

Figure 3A:
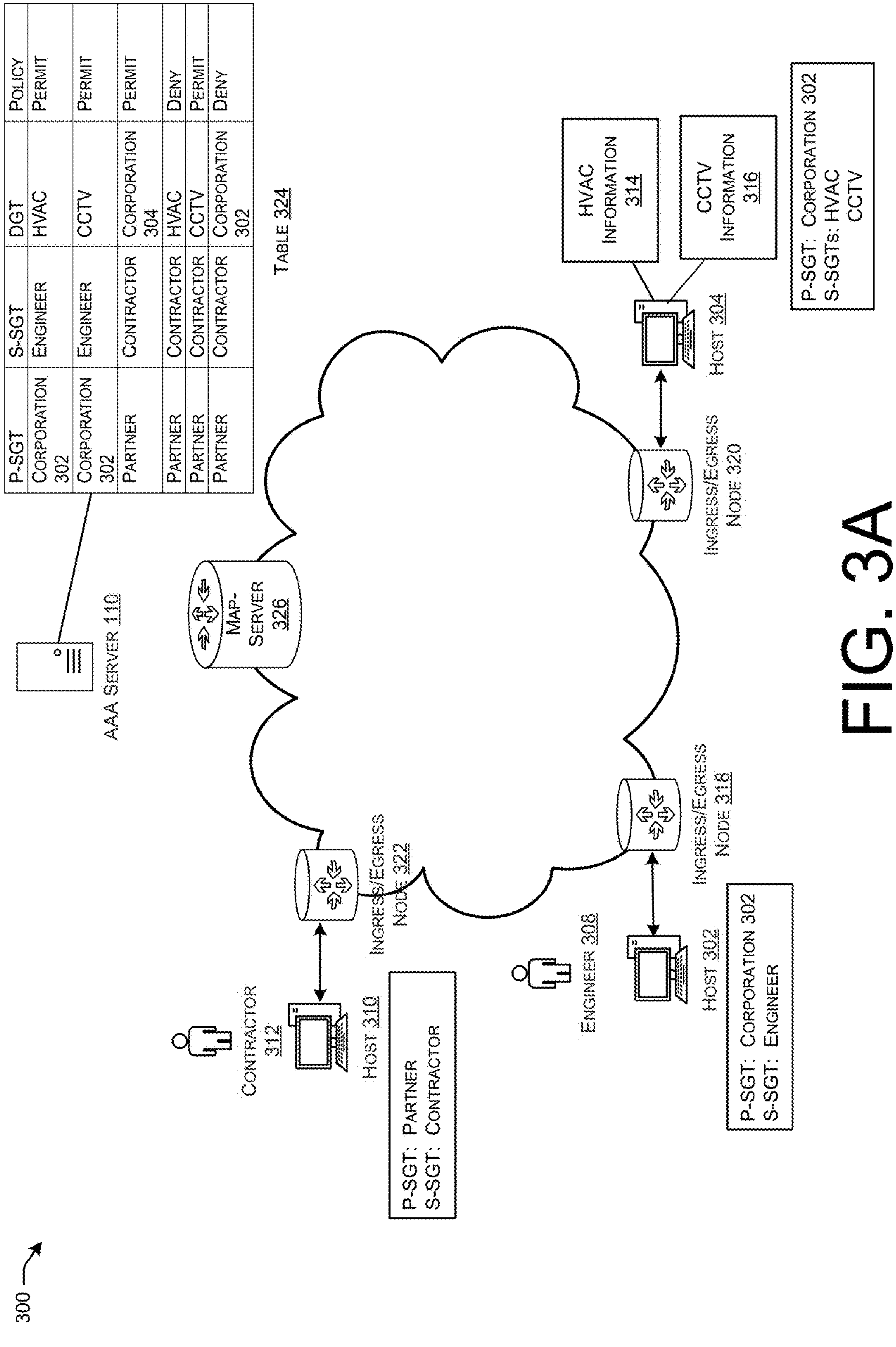
FIGS. 3A-3G schematically illustrate an example of a networking arrangement using primary SGTs and secondary SGTs for SGACL security within networking arrangements, in accordance with techniques and architecture described herein.

In FIG. 3A, an AAA server, e.g., AAA server 110, assigns two SGTs during onboarding of the source and destination hosts 302, 304, and 310 with their respective ingress/egress nodes (e.g., routers, switches, etc.) 318, 320, and 322. For the engineer 308, the P-SGT is "Corporation 302" (corresponding to host 302) and the S-SGT is "engineer." For the contractor 310, the P-SGT is "partner," and the S-SGT is "contractor." For the HVAC information and the CCTV information, the P-SGT is "corporation 304" (corresponding to host 304) while the HVAC information has a S-SGT of "HVAC" and the CCTV information has a S-SGT of "CCTV."

Thus, in this example, the AAA server 110 assigns both the P-SGTs and the S-SGTs to the endpoints (e.g., hosts 302, 304, and 310) during the device onboarding and authentication of the hosts 302, 304, and 310. The AAA server 110 also lists the SGACL rules as can be seen in the table 324 in FIG. 3A. In table 324, the group tag for the destination is referred to as DGT for clarity with respect to the SGACL policies. The hosts 302, 304, and 310 may be authenticated by the ingress/egress node 108 with AAA server 110. The AAA server 110 may then provide the authorization for the hosts 302, 304, and 310 and assign the P-SGTs and the S-SGTs.

Figure 3B:
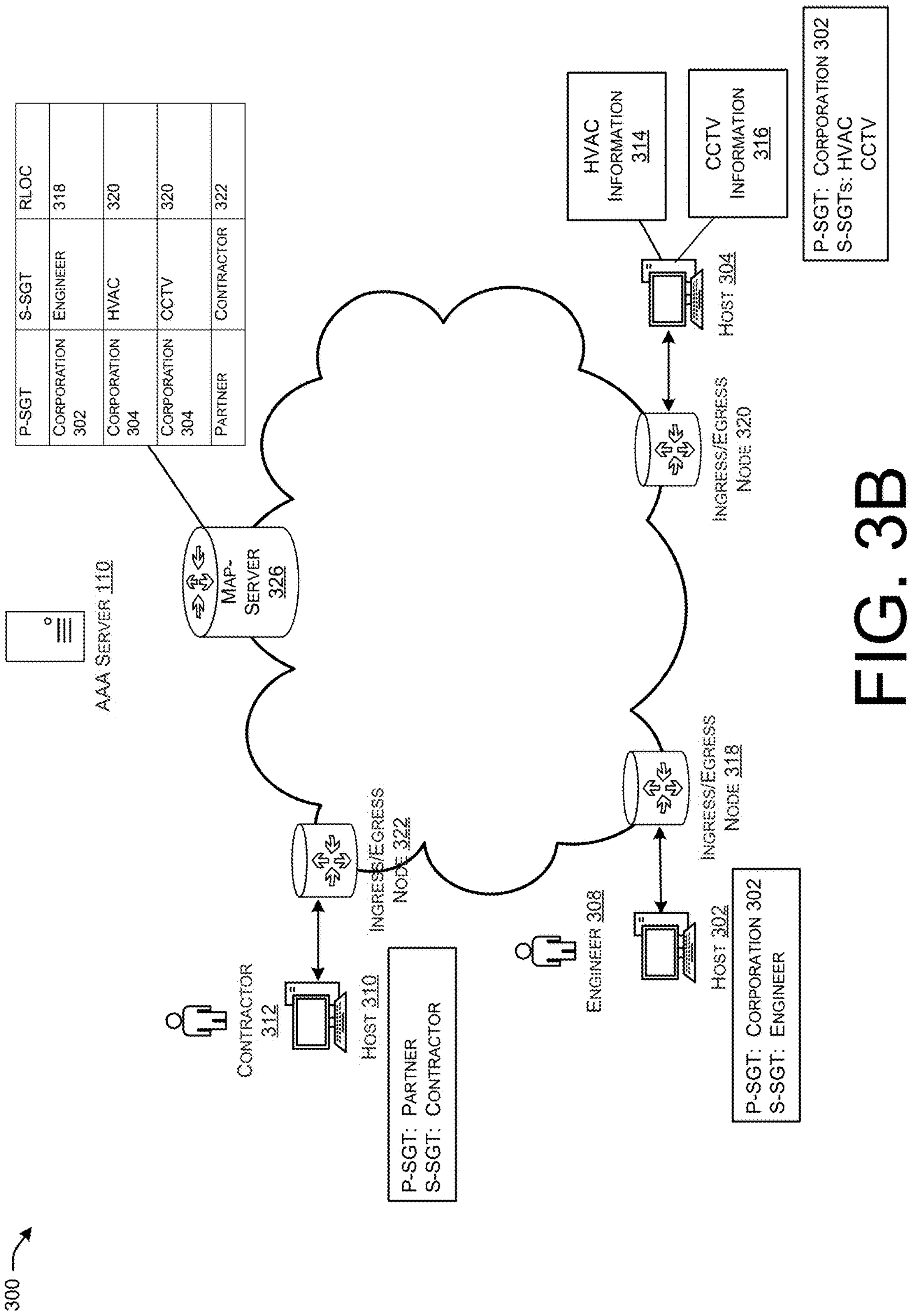

In FIG. 3B, the ingress/egress nodes 318, 320, and 322 may perform a map registration of the P-SGTs and S-SGTs with a map-server 326. Each egress tunnel router (ETR) performs standard endpoint identification functions and associates two or more Internet Protocol (IP) to SGT bindings. The S-SGTs are equal to existing (local) group identifiers. The P-SGTs are higher-level group identifiers.

Figure 3C:
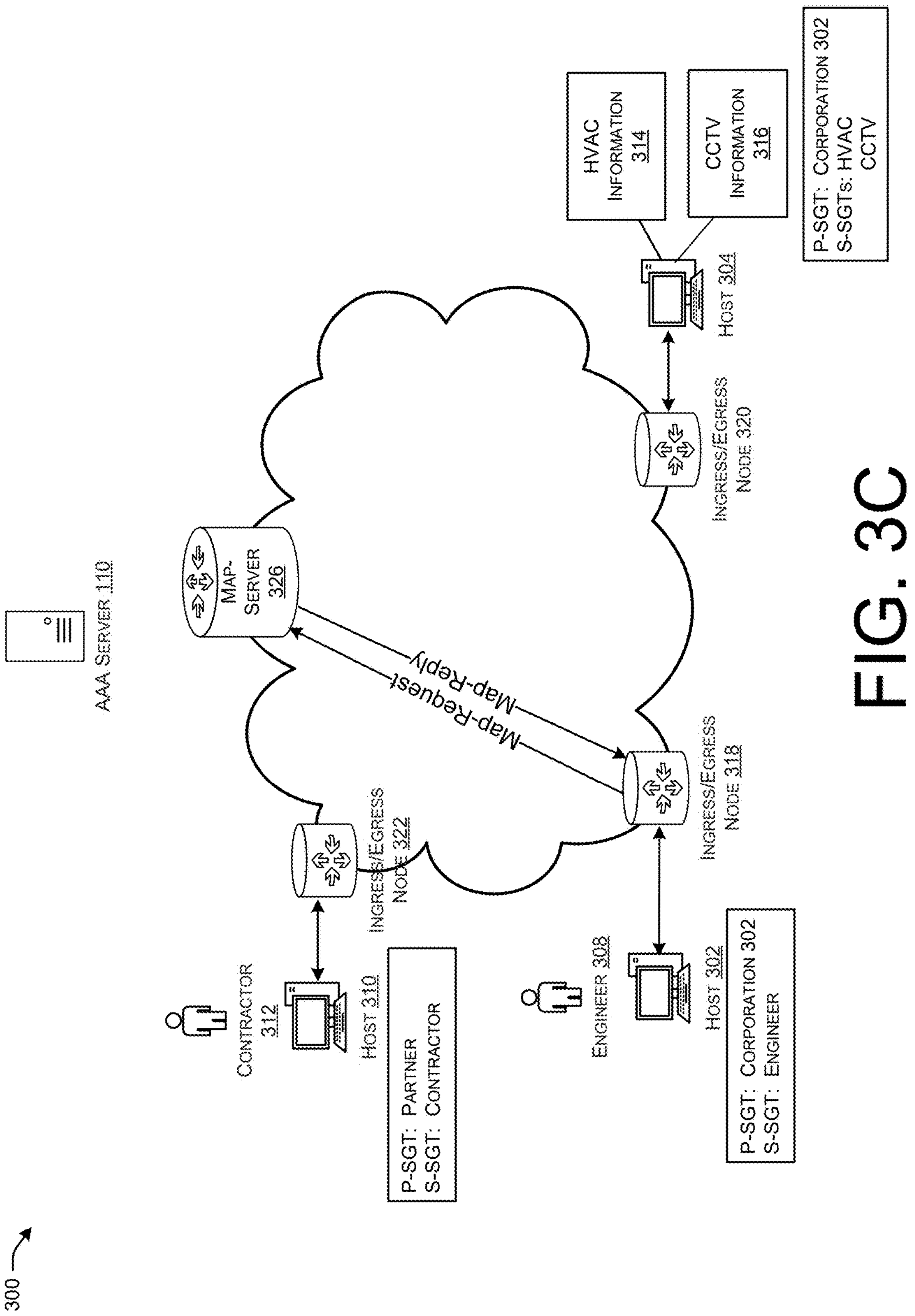

In FIG. 3C, the ingress/egress node 318 may perform a map-request for the host 304 with the map-server 326. The map-server 326 may provide a map reply for the host 304 that includes P-SGTs and S-SGTs for the host 304. For clarity, in this example, the P-SGTs and S-SGTs may be referred to as the P-DGTs and the S-DGTs.

Figure 3D:
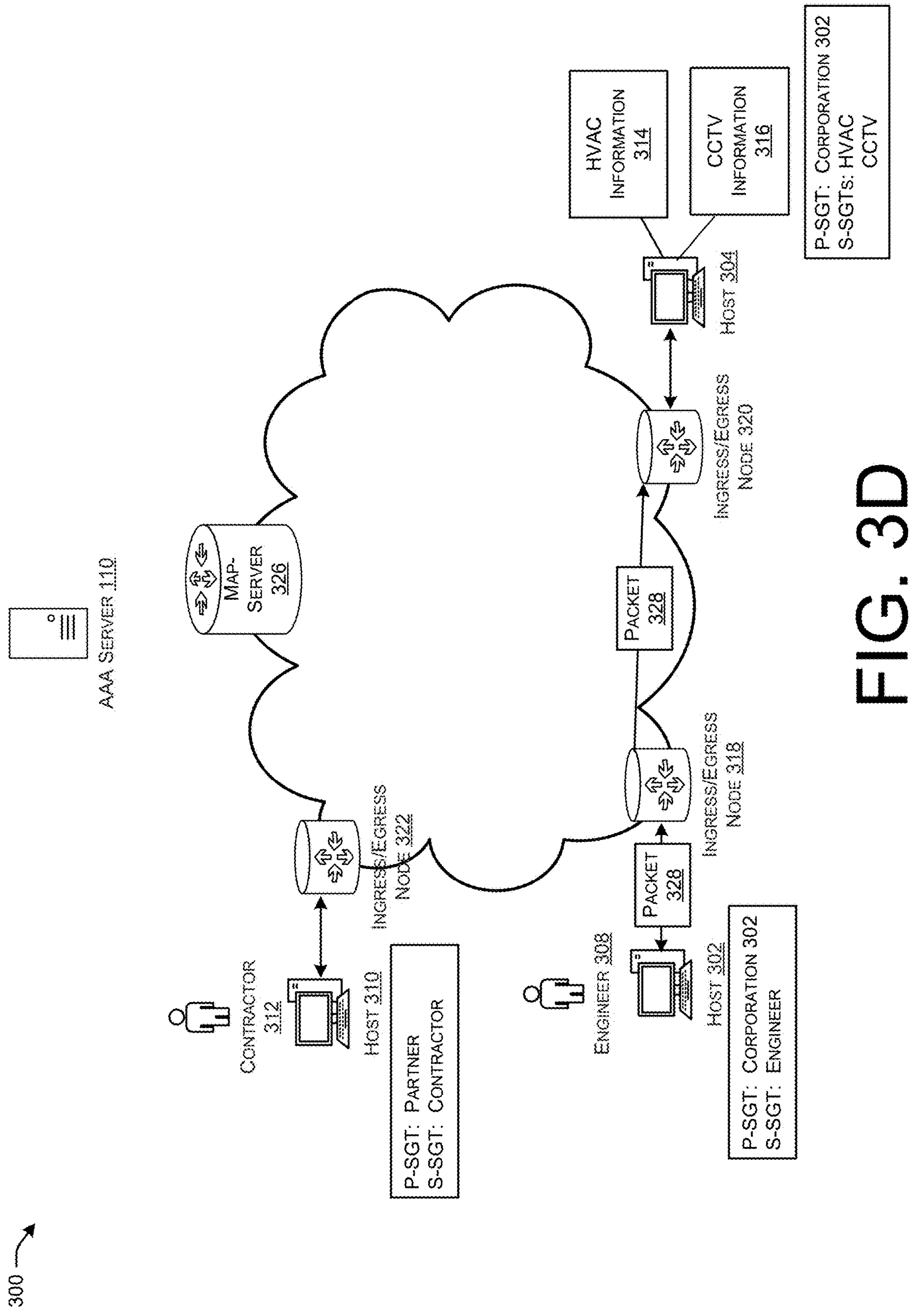

In FIG. 3D, when the host 302 provides a packet 328 to the ingress/egress node 318 destined for HVAC information 314 at host 304, the ingress/egress node 318 may perform security group access control list (SGACL) enforcement using the P-SGT "Corporation 302" and the P-DGT "Corporation 304." Based upon control rules defined by the SGACL, since host 302 is allowed to interact, e.g., communicate, with host 304, then the ingress/egress node 318 may drop the P-SGT "Corporation 302" from the packet 328 and forward the packet 328, carrying only the source S-SGT "Engineer" in the packet header, to the ingress/egress node 320.

Once the packet 328 arrives at the ingress/egress node 320, the ingress/egress node 320 may perform SGACL enforcement using the source S-SGT "Engineer" and the destination S-DGT "HVAC." Since according to the SGACL policies the engineer 308 is allowed to access the HVAC information 314, the packet 328 may be forwarded to the host 304. A similar process may be used for packets sent from the host 304 to host 302.

Figure 3E:
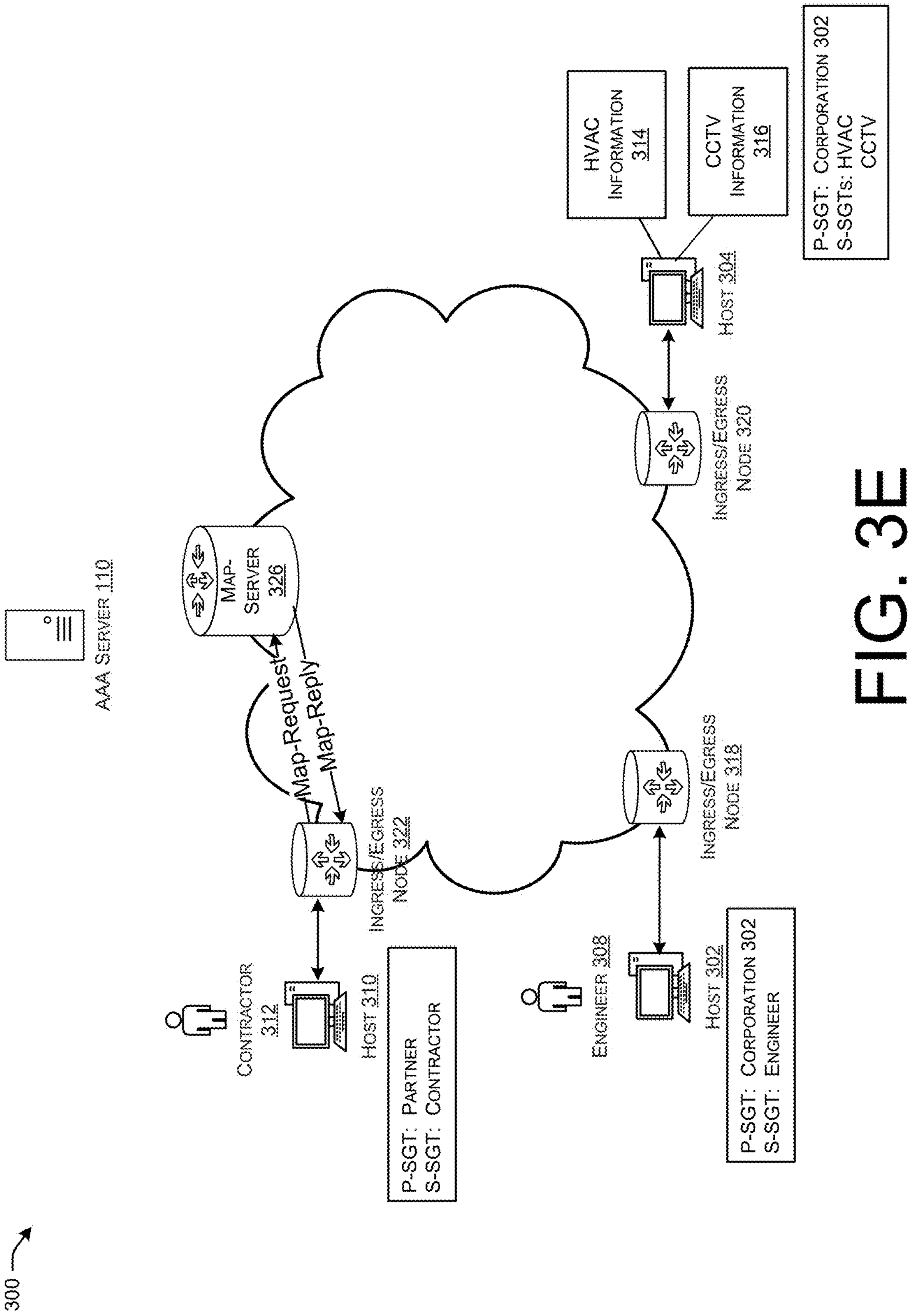

In FIG. 3E, the ingress/egress node 322 may perform a map-request for the host 304 with the map-server 326. The map-server 326 may provide a map reply for the host 304 that includes P-SGTs and S-SGTs for the host 304. For clarity, in this example, the P-SGTs and S-SGTs may be referred to as the P-DGTs and the S-DGTs.

Figure 3F:
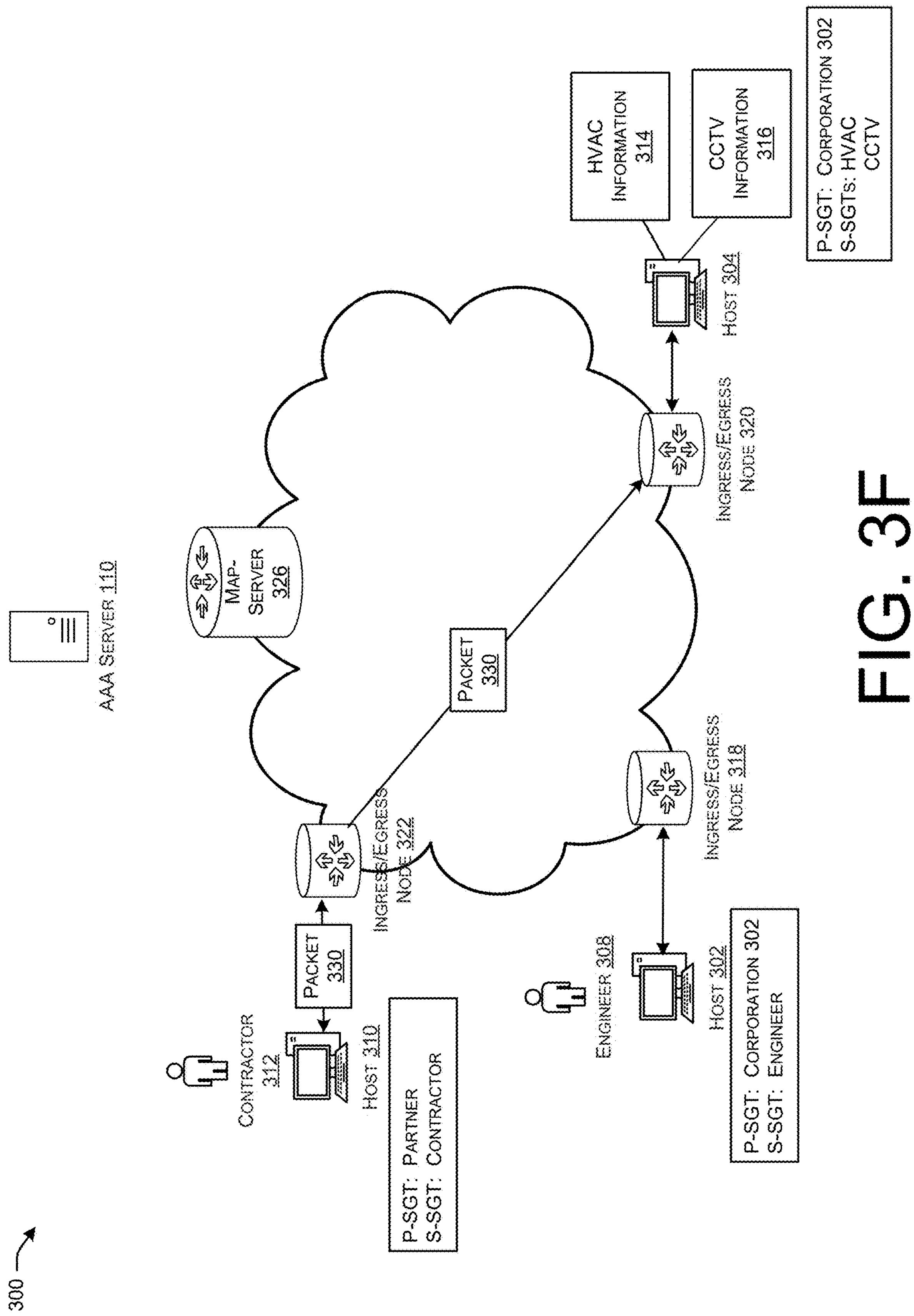

In FIG. 3F, when the host 310 provides a packet 330 to the ingress/egress node 322 destined for CCTV information 314 at host 304, the ingress/egress node 318 may perform security group access control list (SGACL) enforcement using the P-SGT "Partner" and the P-DGT "Corporation 304." Based upon control rules defined by the SGACL, since the partner host 310 is allowed to interact, e.g., communicate, with host 304, then the ingress/egress node 322 may drop the P-SGT "Partner" from the packet 330 and forward the packet 330, carrying only the source S-SGT "Contractor" in the packet header, to the ingress/egress node 320.

Once the packet 330 arrives at the ingress/egress node 320, the ingress/egress node 320 may perform SGACL enforcement using the source S-SGT "Contractor" and the destination S-DGT "CCTV." Since according to the SGACL policies the contractor 310 is allowed to access the CCTV information 316, the packet 330 may be forwarded to the host 304.

However, had the packet 330 been destined for the HVAC information 314, the ingress/egress node 320 would perform SGACL enforcement using the source S-SGT "Contractor" and the destination S-DGT "HVAC." Since according to the SGACL policies the contractor 310 is not allowed to access the HVAC information 314, the packet 330 would be dropped by the ingress/egress node 320. A similar process may be used for packets sent from the host 304 to host 310.

As another part of the example, in FIG. 3E, the ingress/egress node 322 may perform a map-request for the host 302 with the map-server 326. The map-server 326 may provide a map reply for the host 302 that includes P-SGTs and S-SGTs for the host 304. For clarity, in this example, the P-SGTs and S-SGTs may be referred to as the P-DGTs and the S-DGTs.

Figure 3G:
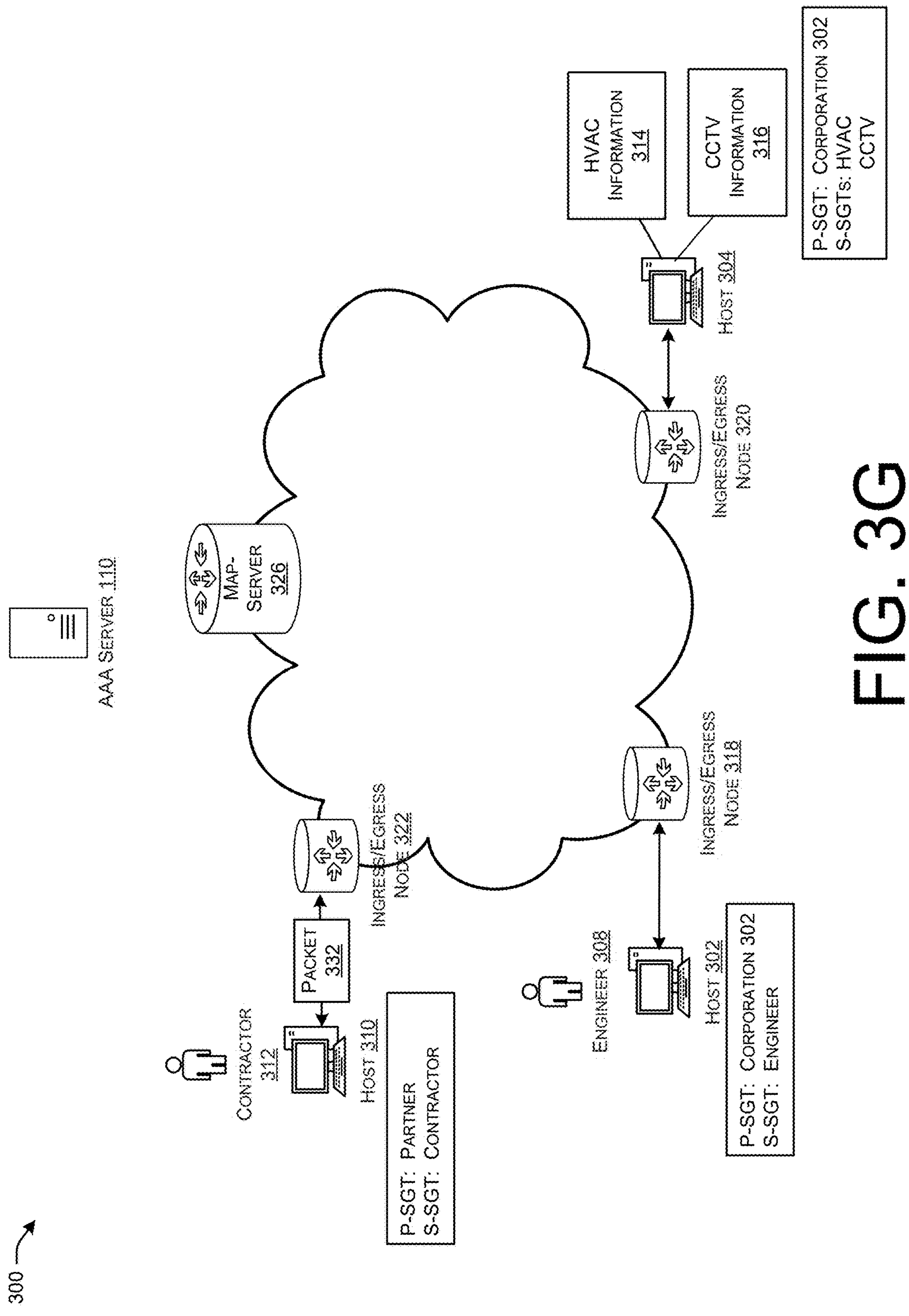

In FIG. 3G, when the host 310 provides a packet 332 to the ingress/egress node 322 destined for the engineer 308 at the host 304, the ingress/egress node 318 may perform security group access control list (SGACL) enforcement using the P-SGT "Partner" and the P-DGT "Corporation 302." Based upon control rules defined by the SGACL, since the partner host 310 is not allowed to interact, e.g., communicate, with host 302, then the ingress/egress node 322 drops the packet 332 and does not forward the packet 332 to the ingress/egress node 318.

Figure 4:
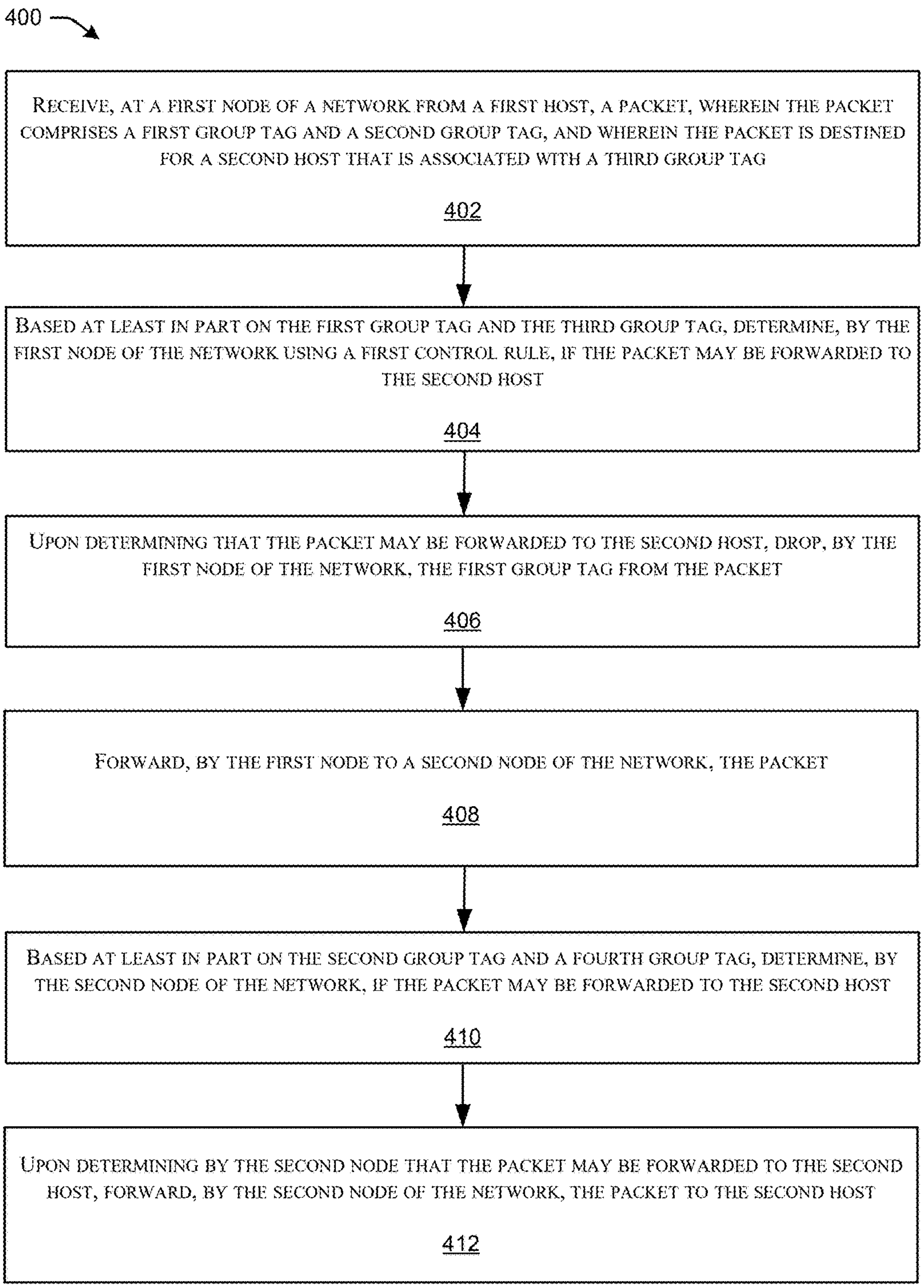
FIG. 4 illustrates a flow diagram of an example method for a flow diagram of an example process 200 of using primary SGTs and secondary SGTs for SGACL security within networking arrangements, in accordance with the techniques and architecture described herein.

FIG. 4 illustrates a flow diagram of an example method 400 and illustrates aspects of the functions performed at least partly by devices of a network as described with respect to FIGS. 1, 2, and 3A-3G. The logical operations described herein with respect to FIG. 4 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 4 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 4 illustrates a flow diagram of an example method 400 for using primary SGTs and secondary SGTs for SGACL security within networking arrangements. In some examples, the method 400 may be performed by a system comprising one or more processors and one or more non-transitory computer-readable media storing computer-executable instructions that, when executed by the one or more processors, cause the one or more processors to perform the method 400.

At 402, a first node of a network receives from a first host, a packet, wherein the packet comprises a first group tag and a second group tag, and wherein the packet is destined for a second host that is associated with a third group tag. For example, computing device **104*a* may wish to interact, e.g., communicate, with computing device 104*b*. Thus, computing device 104*a* may serve as a source host and may onboard with an ingress/egress node 108 of a network, e.g., an access switch. The computing device 104*a* may be authenticated by the ingress/egress node 108 with an authentication, authorization, and accounting (AAA) server 110. The AAA server 110 may then provide the authorization for the computing device 104*a* and assign primary security group tags (P-SGTs) and secondary security group tags (S-SGTs). Likewise, the computing device 104*b* may serve a destination host and may onboard with an egress/ingress node 112, e.g., an access switch, and the egress/ingress node 112 may perform authentication of the computing device 104*a* with the AAA server 110. The AAA server 110 may provide authorization to the egress/ingress node 112 with the P-SGTs and S-SGTs for the computing device 104*b***.

The ingress/egress node 108 may perform a map registration of the P-SGTs and S-SGTs with a map-server 114. Likewise, the egress/ingress node 112 may perform a map registration of the P-SGTs and S-SGTs for the destination host (computing device **104*b*) with the map-server 114**.

The ingress/egress node 108 may perform a map-request for the computing device **104*b* with the map-server 114. The map-server 114 may provide a map-reply for the destination host that includes P-SGTs and S-SGTs for the computing device 104*b*. For clarity, in this example, the P-SGTs and S-SGTs may be referred to as the P-DGTs and the S-DGTs. The computing device 104*a* may then send a packet 116 to the ingress/egress node 108**.

At 404, based at least in part on the first group tag and the third group tag, the first node of the network determines, using a first control rule, if the packet may be forwarded to the second host. For example, when the computing device **104*a* provides a packet 116 to the ingress/egress node 108, the ingress/egress node 108 may perform security group access control list (SGACL) enforcement using the P-SGT 118 and the P-DGT 120**.

At 406, upon determining that the packet may be forwarded to the second host, the first node of the network drops the first group tag from the packet. At 408, the first node forwards, to a second node of the network, the packet. For example, based upon control rules defined by the SGACL, if the P-SGT 118 and the P-DGT are acceptable, for example, the location of the computing device **104*b* is allowed to communicate with the location of the computing device 104*b*, then the ingress/egress node 108 may drop the P-SGT 118 from the packet 116 and forward the packet 116, carrying only the source S-SGT 122 in the packet header, to the egress/ingress node 112. Otherwise, the ingress/egress node 108 drops the packet 116**.

At 410, based at least in part on the second group tag and a fourth group tag, the second node of the network determines if the packet may be forwarded to the second host. At 412, upon determining by the second node that the packet may be forwarded to the second host, the second node of the network forwards the packet to the second host. For example, once the packet 116 arrives at the egress/ingress node 112, the egress/ingress node 112 may perform SGACL enforcement using the source S-SGT 122 and the destination S-DGT 124, e.g., is a particular user, e.g., user 106*a*, (represented by S-SGT 122) allowed to access medical records (represented by the S-DGT 124). If permitted, then the packet 116 may be forwarded to the computing device 104*b*. A similar process may be used for packets sent from the computing device 104*b* (now the source host) to the computing device 104*a* (destination host).

Thus, the techniques and architecture described herein provide secondary identifiers or group tags, e.g., security group tags (SGTs). Control security policies may then be provided for entities within a networking arrangement and separate policies per entity may be provided. This results in assigning a primary SGT per entity and secondary SGTs per entity, wherein the secondary SGT categories are the same at each entity. For example, the secondary SGTs may represent a location, a person, an organization, a partner of the organization, a service, a database, a type of record, etc. Generally, the primary SGTs may represent a location, an entity, an organization, a partner of the organization, a person, etc. However, it is to be noted that the examples of secondary SGTs and primary SGTs are just examples and are not meant to be limiting. Utilizing the "hierarchal" SGT arrangement described herein, security may be efficiently enforced once at an ingress network node using primary SGTs and again at the egress network node using secondary SGTs. This may be done without any changes to the transport constraints of carrying two tags within packets.

More particularly, a separate enforcement point is provided at the edge for a primary/micro level/network site specific level. Once the initial enforcement point has verified the packet at the initial, primary level, the primary tag may be dropped and the packet may be forwarded to the destination carrying only the secondary group tag (a secondary/micro level/service specific representation) for the source. At the destination network node, e.g., the egress node, enforcement may occur as currently performed using a single (secondary) source group tag compared to a single destination group tag. Based upon control rules, this may determine whether the packet may be forwarded by the egress node to the destination host. This arrangement avoids the issue of carrying both the primary (macro) group tag and the secondary (micro) group tag to the destination. In addition, the egress edge node does not have any changes with respect to current security behavior of such nodes.

While embodiments and configurations described herein may refer to Locator ID Separation Protocol (LISP) techniques and/or architecture, it is to be understood that the techniques and architecture described herein are equally applicable to other protocols, e.g., ethernet virtual private network (EVPN).

Figure 5:
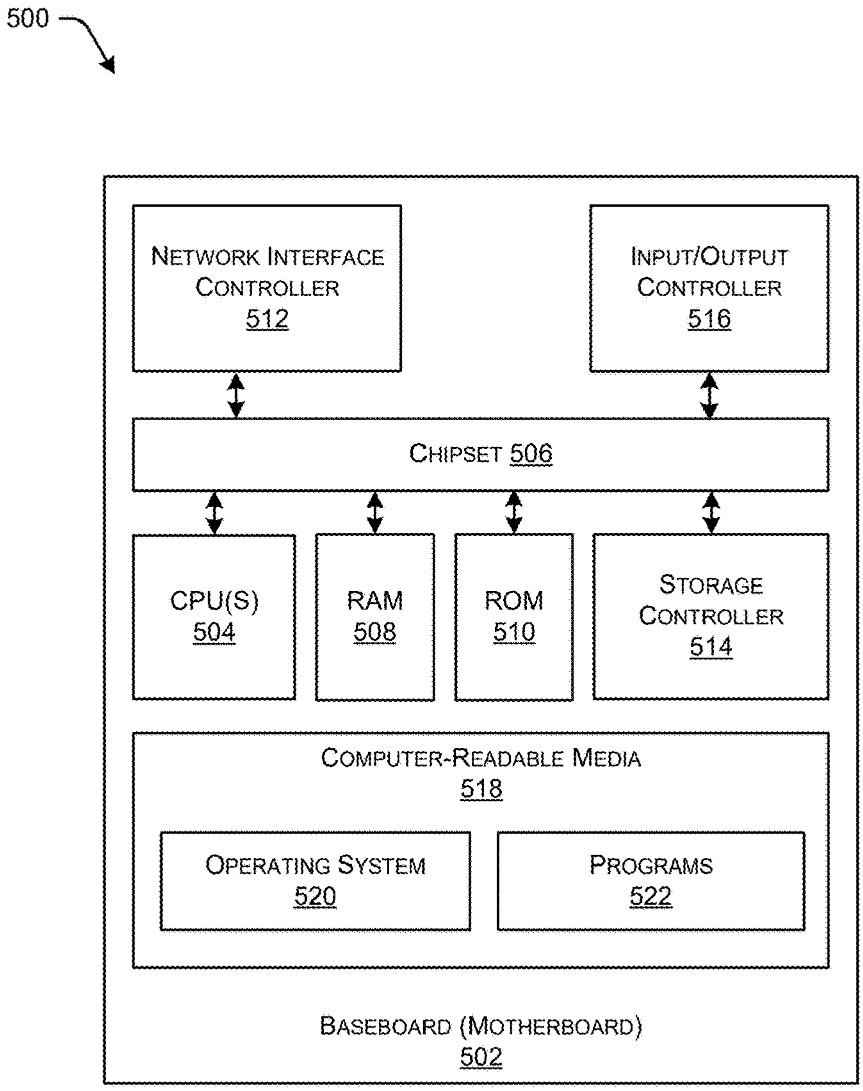
FIG. 5 is a computer architecture diagram showing an example computer hardware architecture for implementing a device that can be utilized to implement aspects of the various technologies presented herein.

FIG. 5 shows an example computer architecture for a computing device 500 capable of executing program components for implementing the functionality described above. In configurations, one or more of the computing devices 500 may be used to implement one or more of the components of FIGS. 1, 2, 3A-3G, and 4. The computer architecture shown in FIG. 5 illustrates a conventional server computer, router, switch, workstation, desktop computer, laptop, tablet, network appliance, e-reader, smartphone, or other computing device such as, for example, a System-on-Chip (SoC), Application-specific Integrated Circuit (ASIC), etc., and can be utilized to execute any of the software components presented herein. The computing device 500 may, in some examples, correspond to a physical device or resources described herein.

The computing device 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computing device 500. One or more of the CPUs 504 may be replaced by one or more GPUs and/or one or more DPUs.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computing device 500. The chipset 506 can further provide an interface to a computer-readable storage medium such as a read-only memory ("ROM") 510 or non-volatile RAM ("NVRAM") for storing basic routines that help to startup the computing device 500 and to transfer information between the various components and devices. The ROM 510 or NVRAM can also store other software components necessary for the operation of the computing device 500 in accordance with the configurations described herein.

The computing device 500 can operate in a networked environment using logical connections to remote computing devices and computer systems through a network. The chipset 506 can include functionality for providing network connectivity through a NIC 512, such as a gigabit Ethernet adapter. In configurations, the NIC 512 can be a smart NIC (based on data processing units (DPUs)) that can be plugged into data center servers to provide networking capability. The NIC 512 is capable of connecting the computing device 500 to other computing devices over networks. It should be appreciated that multiple NICs 512 can be present in the computing device 500, connecting the computer to other types of networks and remote computer systems.

The computing device 500 can include a storage device 518 that provides non-volatile storage for the computer. The storage device 518 can store an operating system 520, programs 522, and data, which have been described in greater detail herein. The storage device 518 can be connected to the computing device 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA")

interface, a fiber channel ("FC") interface, or other type of interface for physically connecting and transferring data between computers and physical storage units.

The computing device 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computing device 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 500 can further read information from the storage device 518 by detecting the physical states or characteristics of one or more particular locations within the physical storage units.

In addition to the mass storage device 518 described above, the computing device 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 500. In some examples, the operations performed by the cloud network, and or any components included therein, may be supported by one or more devices similar to computing device 500. Stated otherwise, some or all of the operations described herein may be performed by one or more computing devices 500 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computing device 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computing device 500.

In one embodiment, the storage device 518 or other computer-readable storage media is encoded with computer-executable instructions which, when loaded into the computing device 500, transform the computer from a general-purpose computing system into a special-purpose computer capable of implementing the embodiments described herein. These computer-executable instructions transform the computing device 500 by specifying how the CPUs 504 transition between states, as described above. According to one embodiment, the computing device 500 has access to computer-readable storage media storing computer-executable instructions which, when executed by the computing device 500, perform the various processes described above with regard to FIGS. 1, 2, 3A-3G, and 4. The computing device 500 can also include computer-readable storage media having instructions stored thereupon for performing any of the other computer-implemented operations described herein.

The computing device 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computing device 500 might not include all of the components shown in FIG. 5, can include other components that are not explicitly shown in FIG. 5, or might utilize an architecture completely different than that shown in FIG. 5.

The computing device 500 may support a virtualization layer, such as one or more virtual resources executing on the computing device 500. In some examples, the virtualization layer may be supported by a hypervisor that provides one or more virtual machines running on the computing device 500 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

receiving, at a first node of a network from a first host, a packet, wherein the packet comprises a first group tag and a second group tag, and wherein the packet is destined for a second host that is associated with a third group tag;

based at least in part on the first group tag and the third group tag, determining, by the first node of the network using a first control rule, if the packet may be forwarded to the second host;

upon determining that the packet may be forwarded to the second host, dropping, by the first node of the network, the first group tag from the packet;

forwarding, by the first node to a second node of the network, the packet;

based at least in part on the second group tag and a fourth group tag, determining, by the second node of the network, if the packet may be forwarded to the second host; and upon determining by the second node that the packet may be forwarded to the second host, forwarding, by the second node of the network, the packet to the second host.

2. The method of claim 1, further comprising:

upon determining, by the first node of the network, that the packet may not be forwarded to the second host, dropping, by the first node of the network, the packet.

3. The method of claim 1, further comprising:

upon determining, by the second node of the network, that the packet may not be forwarded to the second host, dropping, by the second node of the network, the packet.

4. The method of claim 1, further comprising:

onboarding, by the first node of the network, the first host;

authenticating, by the first node of the network with an authentication, authorization, and accounting (AAA) server, the first host; and authenticating, by the AAA server, the first host, wherein during the authenticating, the first tag and the second tag are provided to the first node of the network by the AAA server.

5. The method of claim 4, further comprising:

registering, by the first node of the network a map server, the first tag and the second tag.

6. The method of claim 1, further comprising:

onboarding, by the second node of the network, the second host;

authenticating, by the second node of the network with an authentication, authorization, and accounting (AAA) server, the second host; and authenticating, by the AAA server, the second host, wherein during the authenticating, the third tag and the fourth tag are provided to the second node of the network by the AAA server.

7. The method of claim 6, further comprising:

registering, by the second node of the network a map server, the third tag and the fourth tag.

8. A system comprising:

one or more processors; and one or more non-transitory computer-readable media storing computer-executable instructions that, when executed by the one or more processors, cause the one or more processors to perform actions comprising:

receiving, at a first node of a network from a first host, a packet, wherein the packet comprises a first group tag and a second group tag, and wherein the packet is destined for a second host that is associated with a third group tag;

based at least in part on the first group tag and the third group tag, determining, by the first node of the network using a first control rule, if the packet may be forwarded to the second host;

upon determining that the packet may be forwarded to the second host, dropping, by the first node of the network, the first group tag from the packet;

forwarding, by the first node to a second node of the network, the packet;

based at least in part on the second group tag and a fourth group tag, determining, by the second node of the network, if the packet may be forwarded to the second host; and upon determining by the second node that the packet may be forwarded to the second host, forwarding, by the second node of the network, the packet to the second host.

9. The system of claim 8, wherein the actions further comprise:

upon determining, by the first node of the network, that the packet may not be forwarded to the second host, dropping, by the first node of the network, the packet.

10. The system of claim 8, wherein the actions further comprise:

upon determining, by the second node of the network, that the packet may not be forwarded to the second host, dropping, by the second node of the network, the packet.

11. The system of claim 8, wherein the actions further comprise:

onboarding, by the first node of the network, the first host;

authenticating, by the first node of the network with an authentication, authorization, and accounting (AAA) server, the first host; and authenticating, by the AAA server, the first host, wherein during the authenticating, the first tag and the second tag are provided to the first node of the network by the AAA server.

12. The system of claim 11, wherein the actions further comprise:

registering, by the first node of the network a map server, the first tag and the second tag.

13. The system of claim 8, wherein the actions further comprise:

onboarding, by the second node of the network, the second host;

authenticating, by the second node of the network with an authentication, authorization, and accounting (AAA) server, the second host; and authenticating, by the AAA server, the second host, wherein during the authenticating, the third tag and the fourth tag are provided to the second node of the network by the AAA server.

14. The system of claim 13, wherein the actions further comprise:

registering, by the second node of the network a map server, the third tag and the fourth tag.

15. One or more non-transitory computer-readable media storing computer-executable instructions that, when executed by one or more processors, cause the one or more processors to perform actions comprising:

receiving, at a first node of a network from a first host, a packet, wherein the packet comprises a first group tag and a second group tag, and wherein the packet is destined for a second host that is associated with a third group tag;

based at least in part on the first group tag and the third group tag, determining, by the first node of the network using a first control rule, if the packet may be forwarded to the second host;

upon determining that the packet may be forwarded to the second host, dropping, by the first node of the network, the first group tag from the packet;

forwarding, by the first node to a second node of the network, the packet;

based at least in part on the second group tag and a fourth group tag, determining, by the second node of the network, if the packet may be forwarded to the second host; and upon determining by the second node that the packet may be forwarded to the second host, forwarding, by the second node of the network, the packet to the second host.

16. The one or more non-transitory computer-readable media of claim 15, wherein the actions further comprise:

upon determining, by the first node of the network, that the packet may not be forwarded to the second host, dropping, by the first node of the network, the packet.

17. The one or more non-transitory computer-readable media of claim 15, wherein the actions further comprise:

upon determining, by the second node of the network, that the packet may not be forwarded to the second host, dropping, by the second node of the network, the packet.

18. The one or more non-transitory computer-readable media of claim 15, wherein the actions further comprise:

onboarding, by the first node of the network, the first host;

authenticating, by the first node of the network with an authentication, authorization, and accounting (AAA) server, the first host; and authenticating, by the AAA server, the first host, wherein during the authenticating, the first tag and the second tag are provided to the first node of the network by the AAA server.

19. The one or more non-transitory computer-readable media of claim 18, wherein the actions further comprise:

registering, by the first node of the network a map server, the first tag and the second tag.

20. The one or more non-transitory computer-readable media of claim 15, wherein the actions further comprise:

onboarding, by the second node of the network, the second host;

authenticating, by the second node of the network with an authentication, authorization, and accounting (AAA) server, the second host;

authenticating, by the AAA server, the second host, wherein during the authenticating, the third tag and the fourth tag are provided to the second node of the network by the AAA server; and registering, by the second node of the network a map server, the third tag and the fourth tag.

* * * * *